(No Model.)
W. W. DOOLITTLE.
GAS COMPRESSING PUMP.
No. 265,585. Patented Oct. 10, 1882.
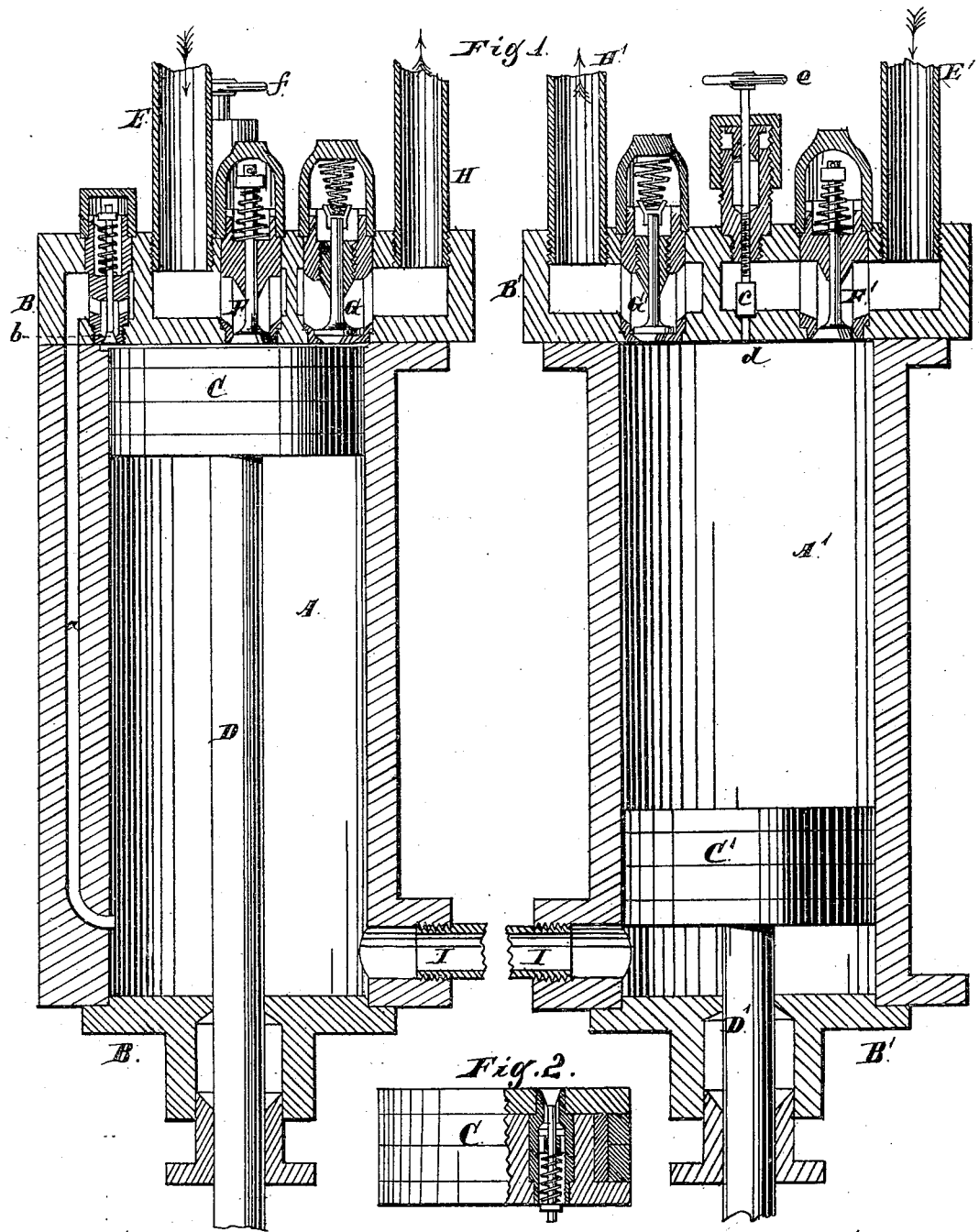
Witnesses:
Inventor:
William W. Doolittle.

UNITED STATES PATENT OFFICE.

WILLIAM W. DOOLITTLE, OF CHICAGO, ILLINOIS.

GAS-COMPRESSING PUMP.

SPECIFICATION forming part of Letters Patent No. 265,585, dated October 10, 1882.

Application filed May 26, 1882. (No model.)

*To all whom it may concern:*

Be it known that I, WM. W. DOOLITTLE, residing at Chicago, in the county of Cook and State of Illinois, and a citizen of the United States, have invented a new and useful Improvement in Gas-Compressing Pumps, of which the following is a full description, reference being had to the accompanying drawings, in which—

Figure 1 is a central longitudinal or vertical section. Fig. 2 is a modification.

In the operation of single-acting gas-compressing pumps a portion of the gas escapes or leaks around the piston-head, and passes from that end of the cylinder in which the compression takes place into the opposite end; and, further, in such pumps a partial vacuum is created in the non-compressing end of the cylinder.

One object of my invention is to provide improved means for saving the gas which leaks past the piston and at the same time produce but little or no pressure on the stuffing-box, and also prevent the formation of a partial vacuum in the cylinder. When the movement of the piston is in the proper direction for compressing the gas, which I accomplish by means of two single-acting cylinders, each having at one end inlet and outlet valves and communicating with each other at their opposite ends, and by providing some suitable relief through which communication is had with the said cylinder upon opposite sides of its piston independent of the inlet-pipe. When the pump stops the piston-head is liable to stop at or near the center of the cylinder and under a great pressure, when moving toward the discharge end of the cylinder, and on account of such pressure it is often very difficult to start the pump again.

Another object of my invention is to obviate the last-mentioned difficulty, which I accomplish by providing a small relief-valve, as hereinafter described.

In the drawings, A A' represent two pump-cylinders, each provided with heads B and B' in the usual manner.

C C' are the pistons, and D D' are the piston-rods, which pass through suitable stuffing-boxes.

E is the inlet for gas into the cylinder A, the gas passing through the inlet-valve F.

G is the outlet-valve through which the compressed gas goes to the outlet-passage H.

E' F' G' H' are corresponding passages and valves for the cylinder A'. The opposite ends of the two cylinders are connected together by means of a passage, I.

*a* is a passage leading from one end of the cylinder A to the opposite end, the inlet to the upper end of the cylinder from the passage *a* being controlled by a small valve, *b*.

The construction and operation of the valves F, G, F', G', and *b* will be understood from the drawings without further description.

*c* is a valve controlling a small opening into the upper end of the cylinder A', which opening *d* communicates also with the inlet-passage, E'. This valve may be operated by a hand-wheel, *e*. The other cylinder, A, is also provided with a valve similar to *c*, which controls a passage similar to the passage *d*.

*f* is a hand-wheel for operating the last-mentioned valve, which is located partly behind F.

The operation is as follows: The gas which escapes around the piston C will pass through the passage *a* and valve *b* into the upper end of the cylinder A, when the pressure is sufficient to overcome the tension of the spring which holds the valve *b* to its seat, and if a light spring be used for this purpose the pressure of the gas in the lower end of this cylinder will be small. The gas which escapes around the piston C' will pass into the cylinder A through the passage I, and thence through the passage *a* into the upper end of the cylinder A through the valve *b*. By this arrangement there never will be but little pressure upon the stuffing-boxes.

In consequence of the communication between the lower ends of the two cylinders through the passage I, a partial vacuum can never be formed behind either piston, air or gas passing from one to the other behind the pistons, according to the direction in which they move.

By means of the valve *c* and a corresponding valve for the other cylinder, the cylinders can be relieved from any compressed gas therein when the pumps stop, which is a desirable feature to facilitate the starting of the pumps.

Instead of the passage *a* for opening communication between the two ends of one of the cylinders, the same result could be accomplished by means of a valve located in one of the pistons, as shown in Fig. 2.

If it should be found advisable to use cylinders of different sizes, the pipe I could be made to communicate with a chamber of suitable size located between the two cylinders for the purpose of equalizing the pressure.

As shown and described, the outer end of the passage $d$ communicates with the inlet-passage E', and a passage in the other cylinder corresponding to $d$ is supposed to communicate with the inlet-passage E. This passage $d$ and the corresponding passage in the other cylinder might be connected by means of a suitable pipe directly with the chamber from which gas is supplied to the cylinders; but there would be no advantage from this construction.

The two cylinders may be located side by side, or at a distance from each other, and in operation the piston-rods which are connected with cranks moving in opposite directions or with other devices that will cause one piston to have a forward movement in its cylinder while the piston of the other cylinder has a return movement at the same time in the usual manner of single-acting pumps—that is to say, when the piston in the cylinder A has a forward movement to discharge the air or gas through the pipe H the piston in the cylinder A' will have a return movement to fill such cylinder through the pipe E'. The passage I permits a free flow of air or gas from one cylinder to the other in the descent of the piston, so that no compression can be had in either cylinder back of the piston. The passage $a$ furnishes a relief, by which any air or gas back of the piston can escape and pass to the cylinder forward of the piston, and this same result is produced by the valve located in the piston, such valve opening in the descent of the piston and closing with the ascent, so that by either means a relief is provided for the gas or air back of the piston by which such gas or air escapes, producing no resistance to the piston, and as both cylinders are connected it will be seen that a relief in one cylinder will act for both.

It will be seen that by this arrangement of cylinders communicating with each other and providing a relief back of the pistons but little, if any, pressure is on the stuffing-boxes.

What I claim as new, and desire to secure by Letters Patent, is as follows:

1. Two single-acting pump-cylinders, each provided at one end with an inlet and an outlet passage controlled by valves and communicating with each other at their opposite ends, and one of said cylinders having a relief controlled by a valve, through which communication is had with the cylinder upon opposite sides of its piston, substantially as and for the purposes specified.

2. Two single-acting pump-cylinders, each provided at one end with an inlet and an outlet passage controlled by valves and communicating with each other at their opposite ends by means of a pipe, I, or other suitable passage, and one of the cylinders having a passage, $a$, communicating with the opposite ends of said cylinder and controlled by a valve, substantially as and for the purposes specified.

3. In a pump for compressing gas, a secondary relief-valve, $c$, located in that end of the cylinder in which compression takes place, and controlling a passage, one end of which communicates with the cylinder, while the other end communicates with the pipe or chamber from which gas is supplied to the cylinder for the purpose of relieving the pressure in the cylinder to facilitate the starting of the pump, substantially as specified.

WILLIAM W. DOOLITTLE.

Witnesses:
E. A. WEST,
O. W. BOND.